(12) United States Patent
Abe et al.

(10) Patent No.: US 10,968,374 B2
(45) Date of Patent: Apr. 6, 2021

(54) TWO-PART CURABLE URETHANE ADHESIVE COMPOSITION

(71) Applicant: The Yokohama Rubber Co., LTD., Tokyo (JP)

(72) Inventors: Megumi Abe, Hiratsuka (JP); Yuichi Matsuki, Hiratsuka (JP)

(73) Assignee: The Yokohama Rubber Co., LTD.

( * ) Notice: Subject to any disclaimer, the term of this patent is extended or adjusted under 35 U.S.C. 154(b) by 70 days.

(21) Appl. No.: 16/308,398

(22) PCT Filed: Apr. 27, 2017

(86) PCT No.: PCT/JP2017/016722
§ 371 (c)(1),
(2) Date: Dec. 7, 2018

(87) PCT Pub. No.: WO2017/212824
PCT Pub. Date: Dec. 14, 2017

(65) Prior Publication Data
US 2019/0136105 A1 May 9, 2019

(30) Foreign Application Priority Data
Jun. 9, 2016 (JP) .............................. JP2016-115507

(51) Int. Cl.
| | |
|---|---|
| C09J 175/04 | (2006.01) |
| C08G 18/32 | (2006.01) |
| C09J 11/06 | (2006.01) |
| C08G 18/65 | (2006.01) |
| C08G 18/12 | (2006.01) |
| C08G 18/71 | (2006.01) |
| C08G 18/48 | (2006.01) |
| C08G 18/78 | (2006.01) |
| C08G 18/69 | (2006.01) |
| C08G 18/28 | (2006.01) |
| C08G 18/76 | (2006.01) |
| C08G 18/73 | (2006.01) |
| C08G 18/79 | (2006.01) |

(52) U.S. Cl.
CPC ........ *C09J 175/04* (2013.01); *C08G 18/3215* (2013.01); *C09J 11/06* (2013.01); *C08G 18/12* (2013.01); *C08G 18/289* (2013.01); *C08G 18/2865* (2013.01); *C08G 18/4812* (2013.01); *C08G 18/4825* (2013.01); *C08G 18/4829* (2013.01); *C08G 18/6588* (2013.01); *C08G 18/69* (2013.01); *C08G 18/718* (2013.01); *C08G 18/73* (2013.01); *C08G 18/7671* (2013.01); *C08G 18/7831* (2013.01); *C08G 18/792* (2013.01)

(58) Field of Classification Search
CPC ....................................................... C09J 175/04
See application file for complete search history.

(56) References Cited

U.S. PATENT DOCUMENTS

2013/0190447 A1* 7/2013 Eichelmann ........... C08G 18/12
524/588

FOREIGN PATENT DOCUMENTS

| JP | 2006-111811 | 4/2006 |
|---|---|---|
| JP | 2006111811 A * | 4/2006 |
| JP | 2006-282959 | 10/2006 |
| JP | 2014-122301 | 7/2014 |
| JP | 2014-122302 | 7/2014 |
| JP | 2014-517089 | 7/2014 |
| JP | 2015-113411 | 6/2015 |
| WO | WO 2012/139940 | 10/2012 |
| WO | WO 2015/088037 | 6/2015 |

OTHER PUBLICATIONS

International Search Report for International Application No. PCT/JP2017/016722 dated May 30, 2017, 4 pages, Japan.

* cited by examiner

Primary Examiner — Daniel H Lee

(74) Attorney, Agent, or Firm — Thorpe North & Western

(57) ABSTRACT

A two-part curable urethane adhesive composition of the present technology comprises: a main agent containing a urethane prepolymer (A), an isocyanate group-containing polyisocyanate (B), and isocyanate silane (C); and a curing agent containing a compound having at least two active hydrogen groups per molecule (D) and an aromatic compound (E) represented by Formula (1) below, where n is an integer of 1 to 5, and X represents a hydrogen atom, a hydroxy group, or an alkoxy group having from 1 to 12 carbons.

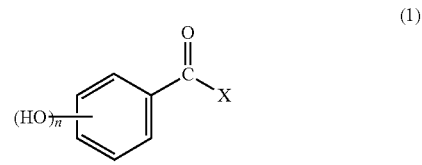

(1)

8 Claims, No Drawings

TWO-PART CURABLE URETHANE ADHESIVE COMPOSITION

TECHNICAL FIELD

The present technology relates to a two-part curable urethane adhesive composition.

BACKGROUND ART

In recent years, resin materials (e.g. olefin-based resins, matrix resins of fiber reinforced plastic (FRP), and the like) have been used for automobile bodies in place of steel plates from the perspective of reducing weight.

Adhesion of such a resin material with a different type of raw material (e.g. glass) has been typically performed by using a primer after the resin material has been subjected to flame processing.

However, problems of negatively affecting environment exist since a primer contains a large amount of solvent.

In response to such problems, the present applicant has proposed a two-part curable urethane adhesive composition that enhances adhesiveness to an adherend (especially, a resin material such as an olefin-based resin) without the use of a primer.

For example, Japan Unexamined Patent Publication No. 2014-122301 describes "an adhesive composition comprising: a main agent containing a urethane prepolymer and an isocyanate silane compound, and a curing agent containing a polyfunctional polyol compound obtained by modifying a terminal of a tri- or higher functional isocyanate having at least one of isocyanurate of hexamethylene diisocyanate, biuret of hexamethylene diisocyanate, or trimethylolpropane adduct of hexamethylene diisocyanate, with rosin diol."

Furthermore, Japan Unexamined Patent Publication No. 2014-122302 describes "an adhesive composition comprising: a main agent containing a urethane prepolymer and an isocyanate silane compound, and a curing agent containing a polyfunctional polyol compound obtained by modifying a terminal of a tri- or higher functional isocyanate having at least one of isocyanurate of hexamethylene diisocyanate, biuret of hexamethylene diisocyanate, or trimethylolpropane adduct of hexamethylene diisocyanate, with polybutadiene diol."

When the inventors of the present technology studied, from the perspective of further enhancement of adhesiveness, changing each component in the main agent and the curing agent for the two-part curable urethane adhesive compositions described in Japan Unexamined Patent Publication Nos. 2014-122301 and 2014-122302, it was found that, although the adhesiveness could be enhanced, formability in the case where approximately 15 minutes was spent on open time (hereinafter, abbreviated as "workability") had room for improvement.

SUMMARY

The present technology provides a two-part curable urethane adhesive composition which is excellent in both workability and adhesiveness.

The inventors of the present technology have found a two-part curable urethane adhesive composition containing a specific aromatic compound in a curing agent component that achieves both excellent workability and adhesiveness.

Specifically, the present technology includes the following features.

[1] A two-part curable urethane adhesive composition comprising:
a main agent containing a urethane prepolymer (A), an isocyanurate group-containing polyisocyanate (B), and isocyanate silane (C); and
a curing agent containing a compound having at least two active hydrogen groups per molecule (D) and an aromatic compound (E) represented by Formula (1) below.

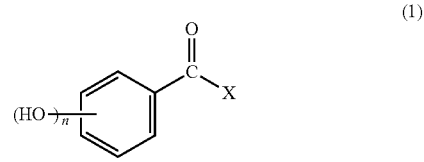

In Formula (1), n is an integer of 1 to 5, and X represents a hydrogen atom, a hydroxy group, or an alkoxy group having from 1 to 12 carbons.

[2] The two-part curable urethane adhesive composition according to [1], wherein the X moiety in Formula (1) is an alkoxy group having from 1 to 12 carbons.

[3] The two-part curable urethane adhesive composition according to [1] or [2], wherein the X moiety in Formula (1) is an alkoxy group having from 3 to 10 carbons.

According to the present technology, a two-part curable urethane adhesive composition which is excellent in both workability and adhesiveness can be provided.

DETAILED DESCRIPTION

The two-part curable urethane adhesive composition of an embodiment of the present technology (hereinafter, abbreviated as "adhesive composition of the present technology") is a two-part curable urethane adhesive composition comprising: a main agent containing a urethane prepolymer (A), an isocyanurate group-containing polyisocyanate (B), and isocyanate silane (C); and a curing agent containing a compound having at least two active hydrogen groups per molecule (D) and an aromatic compound (E) represented by Formula (1) described below.

In the present technology, as described above, excellent workability and excellent adhesion to an adherend (especially, resin material such as olefin-based resin) are achieved by blending a specific aromatic compound in a curing agent component.

Although details are not clearly known, it is conceived that this is because the aromatic compound reacts with the isocyanate group of urethane prepolymer or the like in the main agent faster than the compound having active hydrogen groups in the curing agent (e.g. polyol compound described below and the like); and thus, functions as a temporary protecting group of the isocyanate group, and curing reaction with the compound having active hydrogen groups can be proceeded moderately.

Main Agent

The main agent of the adhesive composition of the present technology contains a urethane prepolymer (A), an isocyanurate group-containing polyisocyanate (B), and isocyanate silane (C).

Urethane Prepolymer (A)

The urethane prepolymer (A) contained in the main agent of the adhesive composition of the present technology is a polymer having a plurality of isocyanate groups, per molecule, at molecular terminals.

A conventionally known urethane prepolymer can be used as such a urethane prepolymer (A). For example, a reaction product, obtained by reacting a polyisocyanate compound with a compound having at least two active hydrogen groups per molecule (hereinafter, abbreviated as "active hydrogen compound") in a manner that the amount of the isocyanate group is in excess relative to the amount of the active hydrogen groups, or the like can be used.

Note that the equivalent ratio of the isocyanate groups to the active hydrogen groups (NCO groups/active hydrogen groups) is preferably from 1.2 to 2.2, and more preferably from 1.5 to 1.8.

Polyisocyanate Compound

The polyisocyanate compound used in the production of the urethane prepolymer (A) is not particularly limited as long as the polyisocyanate compound has two or more isocyanate groups in a molecule.

Specific examples of the isocyanate used in the polyisocyanate compound include aromatic polyisocyanates such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as pentamethylene diisocyanate (PDI), hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPDI), bis(isocyanate methyl)cyclohexane (H$_6$XDI), and dicyclohexylmethane diisocyanate (H$_{12}$MDI); carbodiimide-modified polyisocyanates thereof; isocyanurate-modified polyisocyanates thereof; and the like.

Such a polyisocyanate compound may be used alone, or a combination of two or more types of these polyisocyanate compounds may be used.

Among these, an aromatic polyisocyanate is preferable, and MDI is more preferable, from the perspective of excellent curability.

Active Hydrogen Compound

The active hydrogen compound having at least two active hydrogen groups in a molecule that is used during the production of the urethane prepolymer (A) is not particularly limited.

Preferred examples of the active hydrogen compound include polyol compounds having two or more hydroxy (OH) groups per molecule, polyamine compounds having two or more amino groups and/or imino groups per molecule, and the like. Among these, a polyol compound is preferable.

The polyol compound is not particularly limited with respect to its molecular weight, skeleton, and the like as long as the polyol compound is a compound having two or more OH groups. Specific examples thereof include low-molecular-weight polyhydric alcohols, polyether polyols, polyester polyols, other types of polyols, polyol mixtures thereof, and the like.

Specific examples of the low-molecular-weight polyhydric alcohols include low-molecular-weight polyols such as ethylene glycol (EG), diethylene glycol, propylene glycol (PG), dipropylene glycol, 1,3-butanediol, 1,4-butanediol, pentanediol, neopentyl glycol, hexanediol, cyclohexanedimethanol, glycerin, 1,1,1-trimethylolpropane (TMP), 1,2,5-hexanetriol, and pentaerythritol; sugars such as sorbitol; and the like.

As the polyether polyols and polyester polyols, compounds derived from the low-molecular-weight polyhydric alcohols are typically used, but in the present technology, compounds derived from aromatic diols, amines, and alkanolamines described below may also be favorably used.

Here, specific examples of the aromatic diols include resorcin (m-dihydroxybenzene), xylylene glycol, 1,4-benzene dimethanol, styrene glycol, 4,4'-dihydroxyethyl phenol; compounds having bisphenol skeletons of a bisphenol A structure (4,4'-dihydroxyphenylpropane), a bisphenol F structure (4,4'-dihydroxyphenylmethane), a brominated bisphenol A structure, a hydrogenated bisphenol A structure, a bisphenol S structure, a bisphenol AF structure described below; and the like.

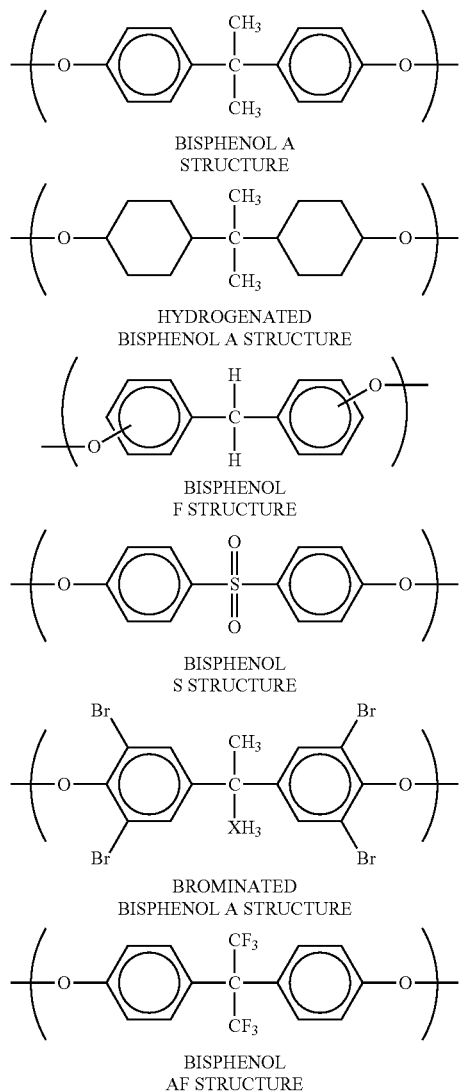

BISPHENOL A STRUCTURE

HYDROGENATED BISPHENOL A STRUCTURE

BISPHENOL F STRUCTURE

BISPHENOL S STRUCTURE

BROMINATED BISPHENOL A STRUCTURE

BISPHENOL AF STRUCTURE

Additionally, specific examples of the amines include ethylenediamine, and hexamethylenediamine. Specific examples of the alkanolamine include ethanolamine, propanolamine and the like.

Examples of the polyether polyols include polyols obtained by adding at least one type selected from styrene oxide, alkylene oxides such as ethylene oxide, propylene oxide, butylene oxide (tetramethylene oxide), and tetrahydrofuran, or the like, to at least one type selected from the compounds that are exemplified as the low-molecular-weight polyhydric alcohols, the aromatic diols, the amines, and the alkanolamines described above; and the like.

Specific examples of the polyether polyol include polyethylene glycol, polypropylene glycol (PPG), polypropylene triol, ethylene oxide/propylene oxide copolymers, polytetramethylene ether glycol (PTMEG), polytetraethylene glycol, sorbitol polyol, and the like.

Likewise, examples of the polyester polyol include the condensation products (condensed polyester polyols) of any of the low-molecular-weight polyhydric alcohols, the aromatic diols, the amines, or the alkanolamines with a polybasic carboxylic acid; lactone polyols; polycarbonate polyols; and the like.

Specific examples of the polybasic carboxylic acid which may be used here to form the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low-molecular-weight carboxylic acid, oligomeric acid, castor oil, hydroxycarboxylic acid such as a reaction product of castor oil and ethylene glycol (or propylene glycol), and the like.

In addition, specific examples of the lactone polyols include compounds that are obtained by ring-opening polymerization of a lactone such as ε-caprolactone, α-methyl-ε-caprolactone, or ε-methyl-ε-caprolactone with a suitable polymerization initiator, and that have hydroxy groups at both ends.

Specific examples of other polyol include acrylic polyol; polybutadiene diol; polymeric polyol having a carbon-carbon bond on the main chain skeleton, such as hydrogenated polybutadiene polyol; and the like.

In the present technology, the various polyol compounds exemplified above may be used alone or may be used in a combination of two or more types.

Among these, because of excellent cost and excellent balance of the elongation at break and the hardness of the adhesive composition of the present technology, which contains the obtained urethane prepolymer (A) in the main agent, a polyether polyol is preferable, and a polypropylene glycol is more preferable.

Specific examples of the polyamine compound include aliphatic polyamines such as ethylenediamine, propylenediamine, butylenediamine, diethylenetriamine, triethylenetriamine, triethylenetetramine, tetraethylenepentamine, pentaethylenehexamine, hexamethylenediamine, trimethylhexamethylenediamine, 1,2-propanediamine, iminobispropylamine, methyliminobispropylamine, and 1,5-diamino-2-methylpentane (MPMD, available from Dupont K.K.); aromatic polyamines such as meta-phenylenediamine, ortho-phenylenediamine, para-phenylenediamine, m-xylylenediamine (MXDA), diaminodiphenyl methane, diaminodiphenyl sulfone, and diamino diethyldiphenylmethane; N-aminoethylpiperazine; monoamine having an ether bond in its main chain, such as 3-butoxyisopropylamine; diamines having a polyether backbone, that is exemplified by JEFFAMINE EDR148 available from Sun Techno Chemicals Co., Ltd.; alicyclic polyamines such as isophoronediamine, 1,3-bisaminomethylcyclohexane (1,3BAC, available from Mitsubishi Gas Chemical Company, Inc.), 1-cyclohexylamino-3-aminopropane, and 3-aminomethyl-3,3,5-trimethyl-cyclohexylamine; diamines having a norbornane backbone, such as norbornanediamine (NBDA, available from Mitsui Chemicals, Inc.); polyamide amines having an amino group at a molecular end of polyamide; 2,5-dimethyl-2,5-hexamethylene diamine, menthenediamine, 1,4-bis(2-amino-2-methylpropyl)piperazine, JEFFAMINE D230 and JEFFAMINE D400, available from Sun Techno Chemicals Co., Ltd., having polypropylene glycol (PPG) as a backbone. These polyamine compounds may be used alone or may be used in a combination of two or more types.

Among these, diamine having a polyether backbone (JEFFAMINE) and hexamethylene diamine are preferable.

Examples of the urethane prepolymer (A) described above include urethane prepolymers obtained by reacting the polyisocyanate compound described above and an active hydrogen compound. Among these, a urethane prepolymer obtained by reacting the aromatic polyisocyanate described above and the polyether polyol is preferable. Specifically, a urethane prepolymer, obtained by reacting a polyether polyol having a molecular weight of 500 to 20000 and an aromatic polyisocyanate compound under a condition that 1.5 to 2.5 moles of isocyanate groups are provided from the aromatic isocyanate compound per 1 mole of hydroxy group in the polyether polyol, is more preferable.

Furthermore, the number average molecular weight of the urethane prepolymer (A) is preferably from 2000 to 15000, and more preferably from 2000 to 10000.

Note that the number average molecular weight is a number average molecular weight (expressed in terms of polystyrene) measured by gel permeation chromatography (GPC), and for the measurement, tetrahydrofuran (THF) and N,N-dimethylformamide (DMF) are preferably used as solvents.

Isocyanurate Group-Containing Polyisocyanate (B)

The isocyanurate group-containing polyisocyanate (B) contained in the main agent of the adhesive composition of the present technology is not particularly limited as long as the isocyanurate group-containing polyisocyanate (B) is a compound having at least one isocyanurate group (ring) and at least two isocyanate groups.

The isocyanurate group-containing polyisocyanate (B) can be produced by publicly known conditions and methods and for example, can be obtained by mixing a compound exemplified as a polyisocyanate compound used during the production of the urethane prepolymer (A) and a catalyst to react these at typically from 50 to 150° C.

The polyisocyanate compound used for production of the isocyanurate group-containing polyisocyanate (B) is not particularly limited but is preferably an aliphatic polyisocyanate, and more preferably pentamethylene diisocyanate (PDI) or hexamethylene diisocyanate (HDI), among compounds exemplified as the polyisocyanate compound used during the production of the urethane prepolymer (A) described above.

Furthermore, specific examples of the catalyst used in the production of the isocyanurate group-containing polyisocyanate (B) include alkoxides such as sodium methylate, amine compounds such as triethylamine, carboxylates such as calcium naphthenate, organometal compounds such as dibutyltin dilaurate, and the like.

In an embodiment of the present technology, a commercially available product can be used as the isocyanurate group-containing polyisocyanate (B).

Specific examples of the commercially available product include Coronate series (Coronate 2030, EH, and the like) available from Tosoh Corporation, Sumidur series (Sumidur IL and the like) and Desmodur series (Desmodur N3390, Z4370, and the like) available from Sumika Covestro Urethane Co., Ltd., Takenate series (Takenate 204 and D170N, Stabio D376N, and the like) available from Mitsui Chemicals, Inc., BURNOCK series (BURNOCK D800, DN980, and the like) available from DIC Corporation, VESTANAT series (VESTANAT T1890/100 and the like) available from Evonik Japan Co., Ltd., and the like.

The content of the isocyanurate group-containing polyisocyanate (B) in the main agent is preferably from 0.5 to 10 parts by mass, and more preferably from 1 to 5 parts by mass, per 100 parts by mass of the urethane prepolymer (A).

Isocyanate Silane (C)

The isocyanate silane (C) contained in the main agent of the adhesive composition of the present technology is a compound having an isocyanate group and a hydrolyzable silicon-containing group.

The isocyanate silane (C) can be obtained by, for example, allowing an isocyanate group-containing compound and a compound, which has a functional group being capable of reacting with the isocyanate group and has a hydrolyzable silicon-containing group, to react.

Specific preferable examples of the isocyanate silane compound (C) are compounds obtained by allowing diisocyanate, such as MDI and TDI, and a silane coupling agent, such as aminoalkoxysilane and mercaptoalkoxysilane, to react, and the like.

Furthermore, an isocyanate silane compound obtained by reacting an isocyanate group-containing compound and a silane coupling agent having an imino group, in which a phenyl group or a derivative thereof is directly bonded to a nitrogen atom, described in JP 2002-053798 A, is also preferably used. Note that the isocyanate group-containing compound is preferably an aliphatic or alicyclic polyisocyanate. Furthermore, it is preferably obtained by allowing the isocyanate group-containing compound and the silane coupling agent to react in a reaction ratio of NCO/NH=3/1 to 3/2.

The content of the isocyanate silane (C) in the main agent is preferably from 0.5 to 10 parts by mass, and more preferably from 1 to 5 parts by mass, per 100 parts by mass of the urethane prepolymer (A).

Curing Agent

The curing agent of the adhesive composition of the present technology contains a compound having at least two active hydrogen groups per molecule (D) and an aromatic compound (E) represented by Formula (1) described below.

Compound Having at Least Two Active Hydrogen Groups per Molecule (D)

The compound having at least two active hydrogen groups per molecule (D) contained in the curing agent of the adhesive composition of the present technology is a component that cures the urethane prepolymer (A) contained in the main agent described above (curing agent component in a narrow sense).

In an embodiment of the present technology, examples of the compound having at least two active hydrogen groups per molecule (D) includes the same compounds exemplified for the active hydrogen compound used for producing the urethane prepolymer (A). Among these, a polyol compound is preferable.

In particular, use of a polyol compound having a hydrophobic backbone, such as polybutadiene diol, as the polyol compound is preferable from the perspective of achieving even better adhesiveness to resin materials, and especially from the perspective of achieving excellent hot water resistant adhesiveness. Furthermore, a combined used with rosin diol is preferable from the perspective of achieving even better adhesiveness to resin materials.

Aromatic Compound (E)

The aromatic compound (E) contained in the curing agent of the adhesive composition of the present technology is a compound represented by Formula (1) below.

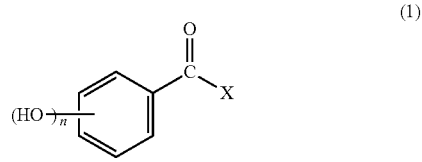

(1)

In Formula (1) above, n is an integer of 1 to 5, and X represents a hydrogen atom, a hydroxy group, or an alkoxy group having from 1 to 12 carbons. Note that "alkoxy group having from 1 to 12 carbons" is synonymous with "X is an —OR group (R represents an alkyl group having from 1 to 12 carbons)".

Note that n in Formula (1) above is preferably an integer from 2 to 4, and more preferably 3.

Furthermore, from the perspective of achieving even better adhesiveness, X in Formula (1) is preferably an alkoxy group having from 1 to 12 carbons, and more preferably an alkoxy group having from 3 to 10 carbons.

Specific examples of the aromatic compound (E) represented by Formula (1) include methyl gallate, ethyl gallate, propyl gallate, octyl gallate, dodecyl gallate, 2,3,4-trihydroxybenzaldehyde, and the like. One type of these may be used alone, or two or more types of these may be used in combination.

Among these, methyl gallate, ethyl gallate, propyl gallate, octyl gallate, and dodecyl gallate are preferable, and propyl gallate and octyl gallate are more preferable.

In an embodiment of the present technology, as described above, blending of the curing agent in the aromatic compound (E) achieves both excellent adhesiveness and excellent workability when the resulting two-part curable urethane adhesive composition is used.

The content of the aromatic compound (E) in the curing agent is preferably from 0.1 to 10 mass %, and more preferably from 0.5 to 5 mass %.

Silane Coupling Agent

The curing agent of the adhesive composition of the present technology preferably contains a silane coupling agent from the perspective of achieving even better adhesiveness of the adhesive composition of the present technology.

The silane coupling agent preferably contains an active hydrogen group, and examples thereof include aminoalkoxysilane, mercaptoalkoxysilane, and the like.

Preferred examples of the aminoalkoxysilane include, specifically, N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, N-phenyl-γ-aminopropyltrimethoxysilane, and the like.

Preferred examples of the mercaptoalkoxysilane include, specifically, 3-mercaptopropyltrimethoxysilane.

In an embodiment of the present technology, the compounding ratio of the main agent to the curing agent in the adhesive composition of the present technology is a ratio in which the molar ratio of the isocyanate group in the main agent to the active hydrogen group in the curing agent (NCO/OH) is preferably from 1.0 to 10.0, and more preferably from 1.5 to 2.5.

Optional Component

The adhesive composition according to an embodiment of the present technology may contain in the main agent or the curing agent, if necessary, various additives, in a range that does not inhibit the object of the present technology, such as fillers, curing catalysts, plasticizers, anti-aging agents, antioxidants, pigments (dyes), thixotropic agents, ultraviolet absorbers, flame retardants, surfactants (including leveling agents), dispersing agents, dehydrating agents, adhesion promoters, and antistatic agents.

The filler can be an organic or inorganic filler of any form. Specific examples thereof include fumed silica, calcined silica, precipitated silica, pulverized silica, molten silica; diatomaceous earth; iron oxide, zinc oxide, titanium oxide, barium oxide, magnesium oxide; calcium carbonate, heavy calcium carbonate, sedimentary calcium carbonate (light calcium carbonate), colloidal calcium carbonate, magnesium carbonate, zinc carbonate; pyrophyllite clay, kaolin clay, calcined clay; carbon black; fatty acid treated products, resin acid treated products, urethane compound treated products, and fatty acid ester treated products thereof; and the like. One type of these may be used alone, or two or more types of these may be used in combination.

The curing catalyst is not particularly limited, and specific examples thereof include carboxylic acids such as 2-ethylhexanoic acid and oleic acid; phosphoric acids such as polyphosphoric acid, ethyl acid phosphate, and butyl acid phosphate; bismuth catalysts such as bismuth octylate; tin catalysts such as dibutyltin dilaurate and dioctyltin dilaurate; tertiary amine catalysts such as 1,4-diazabicyclo[2.2.2]octane and 2,4,6-tris(dimethylaminomethyl)phenol (e.g. DMP-30); and the like.

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, butylene glycol adipate polyester, and the like. One type of these may be used alone, or two or more types of these may be used in combination.

Specific examples of the anti-aging agent include compounds such as a hindered phenol compound.

Specific examples of the antioxidant include butylhydroxytoluene (BHT), butylhydroxyanisole (BHA), and the like.

Specific examples of the pigment include inorganic pigments such as titanium oxide, zinc oxide, ultramarine, iron red, lithopone, lead, cadmium, iron, cobalt, aluminum, hydrochlorides, and sulfates; organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigments, and carbon black; and the like.

Specific examples of the thixotropic agent include Aerosil (available from Nippon Aerosil), Disparlon (available from Kusumoto Chemicals, Ltd.), and the like.

Specific examples of the adhesion promoter include phenol resins, rosin resins, xylene resins, and the like.

Specific examples of the flame retardant include chloroalkyl phosphates, dimethyl-methyl phosphates, bromine-phosphorus compounds, ammonium polyphosphates, neopentyl bromide polyethers, brominated polyethers, and the like.

Specific examples of the antistatic agent include quaternary ammonium salts; hydrophilic compounds such as polyglycols and ethylene oxide derivatives; and the like.

Because the adhesive composition of the present technology has excellent workability as described above, excellent adhesiveness is stably exhibited without the use of a primer composition for adherends formed from materials such as glass and olefin-based resins such as polypropylene resins.

The method of producing the adhesive composition of the present technology is not particularly limited and, for example, the adhesive composition can be prepared by a method in which a main agent containing a urethane prepolymer (A), an isocyanurate group-containing polyisocyanate (B), and isocyanate silane (C), and a curing agent containing a compound having at least two active hydrogen groups per molecule (D) and an aromatic compound (E) represented by Formula (1) are sufficiently mixed separately in a nitrogen gas atmosphere.

Furthermore, in an embodiment of the present technology, the prepared main agent can be filled and stored into a container that has been purged with a nitrogen gas or the like, and the prepared curing agent can be filled and stored in another container, and the main agent and the curing agent can be sufficiently mixed and prepared at the time of use.

EXAMPLES

The present technology is described below in detail with reference to examples. However, no such limitation to the present technology is intended.

Synthesis of Urethane Prepolymer A-1

First, 200 g of polypropylene ether triol with a number average molecular weight of 5,000 (G-5000, trade name "EXCENOL 5030", produced by Asahi Glass Co., Ltd.) and 600 g of polypropylene ether diol with a number average molecular weight of 2,000 (D-2000, trade name EXCENOL 2020", produced by Asahi Glass Co., Ltd.) were charged into a flask and heated to 100° C. to 130° C., and the mixture was dehydrated by stirring while degassing until the moisture content was 0.01% or less. The mixture was then cooled to 90° C., and diphenylmethane diisocyanate (MDI, trade name "Sumidur 44S", produced by Sumika Bayer Urethane Co., Ltd.) was added in an amount of 162 g so that the molar ratio of NCO groups/OH groups was 1.80. Thereafter, the reaction was progressed for approximately 24 hours in a nitrogen atmosphere to synthesize a urethane prepolymer A-1 with an NCO content of 2.5%.

Synthesis of Isocyanate Silane C-1

Biuret of HDI (Takenate D165N, available from Mitsui Chemicals, Inc.) and 3-(N-phenyl)aminopropyltrimethoxysilane (Y9669, available from Momentive Performance Materials Japan LLC) were reacted to synthesize an isocyanate silane C-1.

Examples 1 to 4 and Comparative Examples 1 and 2

Each component of the main agent and the curing agent shown in Table 1 below was compounded according to the compounding amount (part by mass) shown in the same table, and the components were uniformly mixed in a mixer (5 L level) while being degassed for approximately 1 hour to prepare the main agent shown in Table 1. The compounding amount (part by mass) of each of the components of the main agent and the curing agent are shown in Table 1.

The prepared main agent and curing agent are mixed in the compounding amount shown in Table 1 to obtain an adhesive composition.

For each of the obtained adhesive compositions, adhesiveness was evaluated by the methods described below. The results are shown in Table 1.

Workability

Two pieces of adherends were produced by subjecting one surface of a base material (first member) (content of polypropylene: 80 mass %; content of inorganic material (glass filler): 20 mass %) (width: 25 mm; length: 120 mm; thickness: 3 mm) formed from a polypropylene composite material (R-200G, available from Prime Polymer Co., Ltd.) to plasma treatment.

The adhesive composition immediately after the preparation (mixing) was then applied to the surface of one adherend (the face on which the plasma treatment was performed) so that the thickness was 3 mm and left for 15 minutes (open time). Then, the coated surface was adhered to the surface of another adherend (the face on which the plasma treatment was performed) and compression-bonded to produce a test sample.

(1) Formability

When the test sample was adjusted to have a stipulated test sample size (width: 25 mm; length: 120 mm; thickness: 3 mm) after the other adherend was adhered and compression-bonded after the open time, formability (removability) of the adherend that was forced out by the compression bonding was evaluated based on scraping by using a spatula. The case where formability was exhibited was evaluated as "Good", and the case where formability was not exhibited was evaluated as "Poor". The results are shown in Table 1 below.

(2) Adhesion

After the produced test sample was left under the following condition, tensile test was performed at 23° C. in accordance with JIS K 6850:1999, and evaluation was performed based on the following criteria. The results are shown in Table 1 below.

Note that, in Comparative Example 1, it was not possible to form the test sample, and evaluation of the adhesiveness was not performed, which is indicated by "-" in Table 1 below.

Conditions
 left at 20° C. for 72 hours
 left in an oven at 90° C. for 336 hours
Evaluation Criteria
 Excellent: When failure state was visually observed and the case where the cohesive failure was observed in the adhesive was evaluated as "CF", CF was 95% or greater.
 Good: When failure state was visually observed, CF was 90% or greater but less than 95%.

Adhesion

Two pieces of adherends were produced by subjecting one surface of the base material (first member) (content of polypropylene: 80 mass %; content of inorganic material (glass filler): 20 mass %) (width: 25 mm; length: 120 mm; thickness: 3 mm) formed from a polypropylene composite material (R-200G, available from Prime Polymer Co., Ltd.) to plasma treatment.

The adhesive composition immediately after the preparation (mixing) was then applied to the surface of one adherend (the face on which the plasma treatment was performed) so that the thickness was 3 mm. Then, the coated surface was adhered to the surface of another adherend (the face on which the plasma treatment was performed) and compression-bonded to produce a test sample.

After the production, the produced test sample was left at 23° C. for 1 hour, and then tensile test was performed at 23° C. in accordance with JIS K 6850:1999, to measure tensile strength.

Furthermore, after the produced test sample was left under the following condition, tensile test was performed at 23° C. in accordance with JIS K 6850:1999, and evaluation was performed based on the following criteria.

These results are shown in Table 1 below.
Conditions
 Initial: left at 20° C. for 72 hours
 Heat resistance 1: left in an oven at 90° C. for 336 hours
 Heat resistance 2: left in an oven at 80° C. for 30 days
 Hot water resistance: the test sample was immersed in hot water at 40° C. and left for 20 days
Evaluation Criteria
 Excellent: When failure state was visually observed and the case where the cohesive failure was observed in the adhesive was evaluated as "CF", CF was 95% or greater.
 Good: When failure state was visually observed, CF was 90% or greater but less than 95%.
 Somewhat good: When failure state was visually observed, CF was 50% or greater but less than 90%.
 Poor: When failure state was visually observed and the case where the interfacial failure was observed in between the adherend and the adhesive was evaluated as "AF", AF was 50% or greater.

TABLE 1

|  |  | Example | | |
|---|---|---|---|---|
|  |  | 1 | 2 | 3 |
| Main agent | Urethane prepolymer A-1 | 100 | 100 | 100 |
|  | Isocyanurate group-containing polyisocyanate B-1 | 3.0 | 3.0 | 3.0 |
|  | Isocyanate silane C-1 | 2.0 | 2.0 | 2.0 |
|  | Carbon black | 48.6 | 48.6 | 48.6 |
|  | Calcium carbonate | 45.5 | 45.5 | 45.5 |
|  | Plasticizer | 41.0 | 41.0 | 41.0 |
|  | Curing catalyst | 0.5 | 0.5 | 0.5 |

TABLE 1-continued

|  |  |  |  |  |  |  |
|---|---|---|---|---|---|---|
| Curing agent |  | Active hydrogen compound D-1 |  | 15 | 15 | 15 |
|  |  | Aromatic compound E-1 |  | 0.5 |  |  |
|  |  | Aromatic compound E-2 |  |  | 0.5 |  |
|  |  | Aromatic compound E-3 |  |  |  | 0.5 |
|  |  | Aromatic compound E-4 |  |  |  |  |
|  |  | Calcium carbonate |  | 9 | 9 | 9 |
|  |  | Curing catalyst |  | 0.1 | 0.1 | 0.1 |
| Workability | Open time 15 minutes | Formability |  | Good | Good | Good |
|  |  | Adhesion | 20° C., 72 hours | Excellent | Excellent | Excellent |
|  |  |  | 90° C., 336 hours | Excellent | Excellent | Good |
| Adhesion | Normal condition | After 1 hour [MPa] |  | 1.2 | 1.2 | 1.1 |
|  |  | Initial | 20° C., 72 hours | Excellent | Excellent | Excellent |
|  |  | Heat resistance 1 | 90° C., 336 hours | Excellent | Excellent | Excellent |
|  |  | Heat resistance 2 | 80° C., 30 days | Excellent | Excellent | Good |
|  |  | Hot water resistance | 40° C. hot water, 20 days | Excellent | Good | Good |

|  |  |  |  | Example 4 | Comparative Example 1 |
|---|---|---|---|---|---|
| Main agent |  | Urethane prepolymer A-1 |  | 100 | 100 |
|  |  | Isocyanurate group-containing polyisocyanate B-1 |  | 3.0 | 3.0 |
|  |  | Isocyanate silane C-1 |  | 2.0 | 2.0 |
|  |  | Carbon black |  | 48.6 | 48.6 |
|  |  | Calcium carbonate |  | 45.5 | 45.5 |
|  |  | Plasticizer |  | 41.0 | 41.0 |
|  |  | Curing catalyst |  | 0.5 | 0.5 |
| Curing agent |  | Active hydrogen compound D-1 |  | 15 | 15 |
|  |  | Aromatic compound E-1 |  |  |  |
|  |  | Aromatic compound E-2 |  |  |  |
|  |  | Aromatic compound E-3 |  |  |  |
|  |  | Aromatic compound E-4 |  | 0.5 |  |
|  |  | Calcium carbonate |  | 9 | 9 |
|  |  | Curing catalyst |  | 0.1 | 0.1 |
| Workability | Open time 15 minutes | Formability |  | Good | Poor |
|  |  | Adhesion | 20° C., 72 hours | Excellent | — |
|  |  |  | 90° C., 336 hours | Good | — |
| Adhesion | Normal condition | After 1 hour [MPa] |  | 1.3 | 1.1 |
|  |  | Initial | 20° C., 72 hours | Excellent | Excellent |
|  |  | Heat resistance 1 | 90° C., 336 hours | Excellent | Good |
|  |  | Heat resistance 2 | 80° C., 30 days | Good | Somewhat good |
|  |  | Hot water resistance | 40° C. hot water, 20 days | Good | Poor |

The details of each component shown in the rows of "main agent" in Table 1 are as follows.

Urethane prepolymer A-1: urethane prepolymer obtained as described above

Isocyanurate group-containing polyisocyanate B-1: isocyanurate of PDI (Stabio D376N, available from Mitsui Chemicals, Inc.)

Isocyanate silane C-1: isocyanate silane obtained as described above

Carbon black: MA 600 (available from Mitsubishi Chemical Corporation)

Calcium carbonate: Super S (available from Maruo Calcium Co., Ltd.)

Plasticizer: DINP (available from J-PLUS Co., Ltd.)

Curing catalyst: DMDEE (available from San-Apro Ltd.)

The details of each component shown in the rows of "curing agent" in Table 1 are as follows.

Active hydrogen compound D-1: polybutadiene diol (R-15HT, available from Idemitsu Kosan Co., Ltd.)

Aromatic compound E-1: octyl gallate

Aromatic compound E-2: propyl gallate

Aromatic compound E-3: methyl gallate

Aromatic compound E-4: 2,3,4-trihydroxybenzaldehyde

Calcium carbonate: Super #2000 (available from Maruo Calcium Co., Ltd.)

Curing catalyst: TEDA (DABCO) (available from Tosoh Corporation)

From the results shown in Table 1 above, it was found that the adhesive composition prepared by blending none of the specific aromatic compound exhibited poor workability (Comparative Example 1).

On the other hand, it was found that each of the adhesive compositions prepared by blending each of the specific aromatic compounds exhibited excellent workability and excellent adhesiveness to resin materials without use of a primer (Examples 1 to 4).

In particular, from the comparison between Examples 1 to 3 and Example 4, it was found that even better adhesiveness (especially, hot water resistant adhesiveness) is achieved when X of Structural Formula (1) of the aromatic compound is an alkoxy group having from 1 to 12 carbons. From the comparison of Examples 1 to 3, it was found that even better adhesiveness (especially, heat resistant adhesiveness) is achieved when X of Structural Formula (1) of the aromatic compound is an alkoxy group having from 3 to 10 carbons.

The invention claimed is:

1. A two-part curable urethane adhesive composition comprising:
    a main agent containing a urethane prepolymer (A), an isocyanurate group-containing polyisocyanate (B) obtained by mixing a compound exemplified as a polyisocyanate compound used during production of the urethane prepolymer (A) and a catalyst and allowing to react, and isocyanate silane (C) obtained by allowing an isocyanate group-containing compound and a compound which has a functional group being capable of reacting with the isocyanate group and has a hydrolyzable silicon-containing group to react; and
    a curing agent containing a compound having at least two active hydrogen groups per molecule (D) and an aromatic compound (E) represented by Formula (1) below:

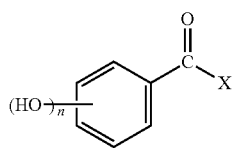

(1)

wherein, n is an integer of 1 to 5, and X represents a hydrogen atom, a hydroxy group, or an alkoxy group having from 1 to 12 carbons.

2. The two-part curable urethane adhesive composition according to claim 1, wherein the X moiety in Formula (1) is an alkoxy group having from 1 to 12 carbons.

3. The two-part curable urethane adhesive composition according to claim 2, wherein the X moiety in Formula (1) is an alkoxy group having from 3 to 10 carbons.

4. The two-part curable urethane adhesive composition according to claim 1, wherein the X moiety in Formula (1) is an alkoxy group having from 3 to 10 carbons.

5. The two-part curable urethane adhesive composition according to claim 1, wherein the isocyanurate group-containing polyisocyanate (B) is isocyanurate of pentamethylene diisocyanate.

6. The two-part curable urethane adhesive composition according to claim 1, wherein a content of the aromatic compound (E) in the curing agent is from 0.1 to 10 mass %.

7. The two-part curable urethane adhesive composition according to claim 1, wherein the main agent or the curing agent contains a tertiary amine catalyst.

8. The two-part curable urethane adhesive composition according to claim 1, wherein the isocyanate silane (C) is synthesized by reacting biuret of hexamethylene diisocyanate and 3-(N-phenyl) aminopropyltrimethoxysilane.

* * * * *